US011901607B2

(12) United States Patent
Udagave et al.

(10) Patent No.: US 11,901,607 B2
(45) Date of Patent: Feb. 13, 2024

(54) MOUNTING ASSEMBLY FOR A BASE STATION ANTENNA

(71) Applicant: CommScope Technologies LLC, Hickory, NC (US)

(72) Inventors: Shital Sawanta Udagave, Goa (IN); Shrikrishna Ghadi, Goa (IN)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 17/831,605

(22) Filed: Jun. 3, 2022

(65) Prior Publication Data

US 2023/0012739 A1 Jan. 19, 2023

(30) Foreign Application Priority Data

Jul. 12, 2021 (IN) ............................ 202121031276

(51) Int. Cl.

*H01Q 1/12* (2006.01)
*H01Q 1/24* (2006.01)
*H01Q 3/06* (2006.01)

(52) U.S. Cl.

CPC ........... *H01Q 1/125* (2013.01); *H01Q 1/1228* (2013.01); *H01Q 1/1242* (2013.01); *H01Q 1/246* (2013.01); *H01Q 3/06* (2013.01)

(58) Field of Classification Search

CPC ...... H01Q 1/005; H01Q 1/125; H01Q 1/1264; H01Q 1/12; H01Q 1/1207; H01Q 1/1221; H01Q 1/1228; H01Q 1/1242; H01Q 1/246; H01Q 3/02; H01Q 3/04; H01Q 3/06; H01Q 3/08; H01Q 3/10

See application file for complete search history.

(56) References Cited

U.S. PATENT DOCUMENTS

2014/0103184 A1* 4/2014 Asrokin .............. H01Q 1/1228 248/514

* cited by examiner

*Primary Examiner* — Robert Karacsony
(74) *Attorney, Agent, or Firm* — Myers Bigel, P.A.

(57) ABSTRACT

A mounting assembly for a base station antenna includes a pair of clamp brackets, a mounting bracket configured to be connected to the base station antenna and a lead screw sub-assembly. The lead screw sub-assembly is adapted to pivotably couple the mounting bracket to the pair of clamp brackets. The lead screw sub-assembly comprising a lead screw engaged with at least one clamp bracket of pair of clamp brackets and an adjustment bracket coupled at a first end of lead screw. The adjustment bracket is configured to allow a pivotal movement of mounting bracket with respect to pair of clamp brackets. The lead screw is rotatable within the at least one clamp bracket for adjusting a tilt angle of the base station antenna. The antenna utilizes a single mounting assembly to facilitate mounting of the antenna to the support structure.

14 Claims, 5 Drawing Sheets

MOUNTING ASSEMBLY FOR A BASE STATION ANTENNA

RELATED APPLICATION

The present application claims priority from and the benefit of Indian Patent Application No. 202121031276, filed Jul. 12, 2021, the disclosure of which is hereby incorporated herein by reference in full.

FIELD OF THE INVENTION

The present disclosure relates to communication systems and, in particular, to a mounting assembly for a base station antenna.

BACKGROUND OF THE INVENTION

The information in this section merely provides background information related to the present disclosure and may not constitute prior art(s) for the present disclosure.

Cellular communications systems are used to provide wireless communications to fixed and mobile subscribers (herein "users"). A cellular communications system may include a plurality of base stations that each provide wireless cellular service for a specified coverage area that is typically referred to as a "cell". Each base station may include one or more base station antennas that are used to transmit radio frequency ("RF") signals to, and receive RF signals from, the users that are within the cell served by the base station. Base station antennas are directional devices that can concentrate the RF energy that is transmitted in certain directions (or received from those directions). A cellular base station antenna is a critical consideration in an efficient cellular network, particularly choosing the antenna with suitable physical characteristics for a specific application.

Typical base station antennas have large size and are bulky and heavy, therefore, such antennas require two or more mounting assemblies for mounting the base station antenna on a support structure, for example, a pole. Employing two or more mounting brackets increases an overall cost, including manufacturing cost, maintenance cost and assembly cost, for the base station antenna. The multiple mounting brackets are generally employed to provide support to the large and heavy base station antennas. The multiple mounting brackets generally include support brackets and tilt adjustment brackets. The multiple mounting brackets are connected at different lengths of the base station antennas. Furthermore, each mounting bracket connected to the base station antenna provides one dedicated function; for example, one or more brackets may be mounted at different lengths of the base station antenna provide only support to the base station antenna and an additional bracket is required to provide tilting operation of the base station antenna. Also, the operation for adjusting tilt angle of the base station antennas may be difficult and time-consuming.

In addition to the electronic steering of the antenna beam, base station antennas may be mechanically steered vertically in an elevation plane. Mechanical tilt to the base station antenna is used to reduce interference and/or coverage in a specific area and to concentrate coverage in a designated area. In a typical installation, the antenna is mounted to a support structure, such as a pole, by at least a pair of brackets. The mechanical tilt of the antenna is typically performed by pivoting the antenna about a horizontal axis defined by a first bracket using a second adjustable bracket mounted at different length of the base station antenna. One typical adjustable bracket comprises a scissor-style bracket. The scissor-style bracket is generally mounted near a top end cap of the base station antennas and is configured to provide tilt angle adjustment to base station antennas. However, the scissor style bracket does not provide sufficient strength to the heavy base station antennas and therefore, there is a requirement for mounting one or more additional brackets near a bottom end cap of the base station antennas, which in turn increases the overall cost of the base station antennas. Further, the scissor-style bracket does not provide up-tilt angle adjustment to the base station antenna.

More recently, base station antennas have been modified to have a compact structure by reducing size of radiating elements and other respective components assembled to the base station antennas. The reduction in size of base station antennas has reduced problems related to space constraint for mounting multiple antennas in a single support structure as well as the manufacturing cost of said base station antennas. However, the compact base station antennas are still attached to the support structure using two-point mount brackets as described above, for fixing the base station antennas with the support structure, wherein the first bracket is attached near a bottom end cap of the base station antenna providing support to the base station antenna, and the second bracket is a scissor-style bracket is attached near a top end cap of the base station antenna providing tilt adjustment to the base station antenna. The scissor action of the bracket also creates a potential pinch point for the installer. All of these issues are exacerbated when it is considered that the installation and adjustment of the antenna is often performed on antenna towers that are exposed to the elements and at significant elevations. Furthermore, said two-point mount brackets do not provide a sufficient up-tilt angle or down-tilt angle to the base station antennas which may be varied based on different installation sites, to reduce interference and/or coverage in a specific area and to concentrate coverage in a designated area. Said two-point mounting assembly is an over-design and expensive solution for mounting the base station antennas that have reduced length and are light in weight.

Accordingly, there remains a need of a mounting assembly for base station antennas having small length and less weight.

SUMMARY OF THE INVENTION

The one or more shortcomings of the prior art are overcome by the system and method as claimed, and additional advantages are provided through the provision of the system and method as claimed in the present disclosure. Additional features and advantages are realized through the techniques of the present disclosure. Other embodiments and aspects of the disclosure are described in detail herein and are considered a part of the claimed disclosure.

Pursuant to the embodiments of the present disclosure, in an aspect, a mounting assembly for a base station antenna is provided. The mounting assembly comprises a pair of clamp brackets, a mounting bracket configured to be connected to the base station antenna and a lead screw sub-assembly. The lead screw sub-assembly is adapted to pivotably couple the mounting bracket to the pair of clamp brackets. The lead screw sub-assembly comprises a lead screw engaged with at least one clamp bracket of the pair of clamp brackets and an adjustment bracket coupled at a first end of the lead screw. The adjustment bracket is configured to allow a pivotal movement of the mounting bracket with respect to the pair of clamp brackets. The lead screw is rotatable within the at least one clamp bracket for adjusting a tilt angle of the base station antenna.

In another non-limiting embodiment of the present disclosure, the mounting bracket comprises an elongated slot defined in a side wall of the mounting bracket. The elongated slot is configured to receive and guide a connecting pin of the adjustment bracket.

In another non-limiting embodiment of the present disclosure, the mounting assembly comprises an intermediate member connected to a first clamp bracket of the pair of clamp brackets arranged proximal to the mounting bracket. The intermediate member is configured to couple with the mounting bracket for supporting the mounting bracket.

In another non-limiting embodiment of the present disclosure, the intermediate member is integrally formed with the first clamp bracket.

In another non-limiting embodiment of the present disclosure, the intermediate member comprises a third pair of flanges formed at opposite ends thereof. The mounting bracket comprises a second pair of flanges formed at opposite ends thereof. Each flange of the third pair of flanges is connected with a corresponding flange of the second pair of flanges for coupling the intermediate member with the mounting bracket.

In another non-limiting embodiment of the present disclosure, each flange of the third pair of flanges is coupled with the corresponding flange of the second pair of flanges by fasteners.

In another non-limiting embodiment of the present disclosure, the third pair of flanges is pivotably coupled with the second pair of flanges and the second pair of flanges being configured to pivot around the fasteners.

In another non-limiting embodiment of the present disclosure, the lead screw comprises a first portion adapted to rotate within the at least one clamp bracket and a second portion adapted to receive a locking nut for coupling the adjustment bracket with the lead screw at the first end of the lead screw.

In another non-limiting embodiment of the present disclosure, a diameter of the second portion of the lead screw is less than a diameter of the first portion of the lead screw.

In another non-limiting embodiment of the present disclosure, rotation of the lead screw moves the connecting pin within the elongated slot of the mounting bracket for adjusting the tilt angle of the base station antenna.

In another non-limiting embodiment of the present disclosure, the tilt angle of the base station antenna lies within a range of 0-15° in a down-tilt direction.

In another non-limiting embodiment of the present disclosure, the tilt angle of the base station antenna lies within a range of 0-5° in an up-tilt direction.

In another non-limiting embodiment of the present disclosure, a point of contact of the mounting bracket with the base station antenna is proximate a centre of gravity of the base station antenna.

In another non-limiting embodiment of the present disclosure, the adjustment bracket comprises a base plate defined with a first aperture adapted to receive the second portion of the lead screw and a pair of arms extending perpendicularly from opposite ends of the base plate.

In another non-limiting embodiment of the present disclosure, the adjustment bracket is provided with a second apertures formed on each of the pair of arms to receive a connecting pin.

In another aspect of the present disclosure, a method for adjusting a tilt angle of a base station antenna connected to a mounting bracket of a mounting assembly is disclosed. The method comprises the steps of: loosening fasteners adapted to connect the mounting bracket with an intermediate member; applying rotational movement to a lead screw connecting the mounting bracket with one of a pair of clamp brackets, such that an adjustment bracket secured to the lead screw exerts a push force or pull force onto the mounting bracket to facilitate pivotal movement of the mounting bracket for adjusting a tilt angle of the base station antenna with respect to the pair of clamp brackets; and tightening the fasteners connecting the mounting bracket with the intermediate member to secure the base station antenna at a particular orientation.

It is to be understood that the aspects and embodiments of the disclosure described above may be used in any combination with each other. Several of the aspects and embodiments may be combined together to form a further embodiment of the disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF FIGURES

The novel features and characteristics of the disclosure are set forth in the description. The disclosure itself, however, as well as a preferred mode of use, further objectives, and advantages thereof, will best be understood by reference to the following description of an illustrative embodiment when read in conjunction with the accompanying drawings. One or more embodiments are now described, by way of example only, with reference to the accompanying drawings wherein like reference numerals represent like elements and in which.

Figure 1:
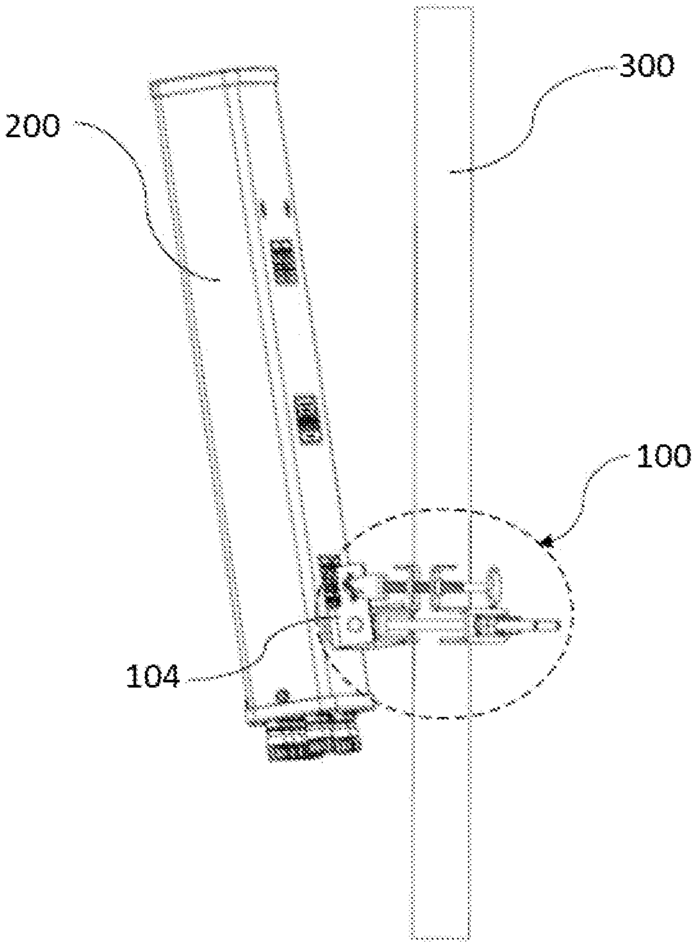
FIG. 1 is a perspective view of an exemplary mounting assembly that has been utilized for mounting a base station antenna to a support structure, in accordance with an embodiment of the present disclosure.

Skilled artisans will appreciate that elements in the drawings are illustrated for simplicity and have not necessarily been drawn to scale. For example, the dimensions of some of the elements in the drawings may be exaggerated relative to other elements to help to improve understanding of embodiments of the present disclosure.

DETAILED DESCRIPTION OF THE INVENTION

While the disclosure is susceptible to various modifications and alternative forms, specific embodiments thereof have been shown by way of example in the FIGS. and will be described in detail below. It should be understood, however that it is not intended to limit the disclosure to the particular forms disclosed, but on the contrary, the disclosure is to cover all modifications, equivalents, and alternatives falling within the scope of the disclosure as defined by the appended claims.

Before describing detailed embodiments, it may be observed that the present disclosure is directed to a mounting assembly for a base station antenna and a method for adjusting a tilt angle of the base station antenna. It is to be noted that a person skilled in the art can be motivated from the present disclosure and modify the various constructions of the mounting assembly of base station antenna and the steps of performing the method of the present disclosure. However, such modification should be construed within the scope of the present disclosure. Accordingly, the drawings are showing only those specific details that are pertinent to understanding the embodiments of the present disclosure so as not to obscure the disclosure with details that will be readily apparent to those of ordinary skill in the art having benefit of the description herein.

In the present disclosure, the term "exemplary" is used herein to mean "serving as an example, instance, or illustration." Any embodiment or implementation of the present subject matter described herein as "exemplary" is not necessarily to be construed as preferred or advantageous over other embodiments.

The terms "comprises", "comprising", or any other variations thereof, are intended to cover a non-exclusive inclusions, such that a device that comprises a list of components does not include only those components but may include other components not expressly listed or inherent to such setup or device. In other words, one or more elements in a system or apparatus proceeded by "comprises . . . a" does not, without more constraints, preclude the existence of other elements or additional elements in the system or apparatus.

The terms like "at least one" and "one or more" may be used interchangeably or in combination throughout the description.

Embodiments of the mounting assembly described in the present disclosure are configured to provide a mechanical tilt in both up-tilt and down-tilt direction to adjust the base station antenna (hereinafter referred to as "antenna") when compared to the existing systems, eliminates loose components, reduces the number of components that the installer needs to loosen, eliminates alignment issues and eliminates scissor pinch points. Furthermore, the antenna may utilize only one mounting assembly to for mounting the antenna on the support structure. The mounting assembly is employed to all antennas having antenna length up to 1000 mm and weight up to 15 kg. However, the mounting assembly may be modified to provide sufficient support and tilt angle adjustment to the antennas having physical parameters other than those defined above.

Pursuant to embodiments of the present disclosure, a mounting assembly for connecting an antenna to a support structure includes a pair of clamp brackets, a mounting bracket configured to be connected to the antenna and a lead screw sub-assembly. The lead screw sub-assembly is adapted to pivotably couple the mounting bracket to the pair of clamp brackets. The lead screw sub-assembly comprises a lead screw engaged with at least one clamp bracket of the pair of clamp brackets and an adjustment bracket coupled at a first end of the lead screw. The adjustment bracket is configured to allow a pivotal movement of the mounting bracket with respect to the pair of clamp brackets. The lead screw of the lead screw sub-assembly is rotatable within the at least one clamp bracket for adjusting a tilt angle of the antenna.

In an embodiment, the mounting bracket comprises an elongated slot defused in a side wall of the mounting bracket. The elongated slot is configured to receive and guide a connecting pin of the adjustment bracket.

In accordance with further embodiments, the mounting assembly comprises an intermediate member connected to a first clamp bracket of the pair of clamp brackets arranged proximal to the mounting bracket. The intermediate member is configured to couple with the mounting bracket for provide support and strength to the mounting bracket.

In an embodiment, the intermediate member comprises a third pair of flanges formed at opposite ends thereof and the mounting bracket comprises a second pair of flanges formed at opposite ends thereof. Each flange of the third pair of flanges is connected with a corresponding flange of the second pair of flanges by fasteners for coupling the intermediate member with the mounting bracket. The third pair of flanges is pivotably coupled with the second pair of flanges and the second pair of flanges being configured to pivot around the fasteners. The coupling of each flange of the third pair of flanges with the corresponding flange of the second pair of flanges may utilize other coupling means which are configured to provide a pivotal movement of the mounting bracket with respect to the intermediate member.

Further, in an embodiment, the lead screw sub-assembly comprising the lead screw is defined with a first portion and a second portion, such that the first portion is adapted to rotate within the at least one clamp bracket. The second portion of the lead screw is adapted to receive a locking nut for coupling the adjustment bracket with the lead screw at the first end of the lead screw. The diameter of second portion of the lead screw is less than a diameter of the first portion of the lead screw to form a step-profile structure at the first end of the lead screw. The step-profile of the lead screw limits movement of the adjustment bracket towards the second end of the lead screw by preventing movement of the adjustment bracket over the first portion.

Furthermore, in an embodiment, the adjustment bracket comprises a base plate and a pair of arms extending perpendicularly from opposite ends of the base plate. The base plate is defined with a first aperture adapted to receive the second portion of the lead screw. Each of the pair of arms of the adjustment bracket is defined with a second apertures. The second apertures are adapted to receive the connecting pin to facilitate a pivotable connection between the mounting bracket and the adjustment bracket. The rotation of lead screw in a clock-wise or counter-clockwise direction facilitates down-tilt or up-tilt of the antenna connected to the mounting bracket.

In other embodiments, a method for adjusting tilt angle of a base station antenna connected to a mounting bracket of a mounting assembly is disclosed. The method comprises loosening of fasteners adapted to connect the mounting bracket with an intermediate member. The method further comprises applying rotational movement to a lead screw connecting the mounting bracket with one of a pair of clamp brackets, such that an adjustment bracket secured to the lead screw exerts a push force or pull force onto the mounting bracket to facilitate pivotal movement of the mounting bracket for adjusting a tilt angle of the antenna with respect to the pair of clamp brackets. Furthermore, once the antenna is positioned in a desired angular orientation, tightening of the fasteners connecting the mounting bracket with the intermediate member is performed to secure the antenna at a particular orientation.

Reference will now be made to the exemplary embodiments of the disclosure, as illustrated in the accompanying drawings. Wherever possible same numerals will be used to refer to the same or like parts.

Embodiments of the disclosure are described in the following paragraphs with reference to FIGS. 1 to 7. In FIGS. 1 to 7, the same element or elements which have same functions are indicated by the same reference signs.

FIG. 1 is a perspective view of an arrangement in which an exemplary mounting assembly 100 has been utilized to mount a base station antenna 200 to a support structure 300. The support structure 300 may be defined as a pole or any similar vertical structure rigidly fixed to a surface. The mounting assembly 100 is connected near a bottom end cap 200*b* of the antenna 200. A centre gravity of the antenna 200 may be considered while determining the position of mounting the mounting assembly 100 to the base station antenna 200. In other words, the position of fixing the mounting assembly 100 with the antenna 200 may be determined based on the centre of gravity of the antenna 200. The position for fixing the mounting assembly 100 may be selected to maintain the centre of gravity of the antenna 200 near the position of the mounting assembly 100 (and in some embodiments the centre of gravity is slightly above the mounting assembly 100). The position of the mounting assembly 100 may prevent bending of the antenna 200.

In an exemplary embodiment of the present disclosure, the mounting assembly 100 is employed with antennas 200 having an antenna length less than 1000 mm. Further, the mounting assembly 100 may be configured to secure the antenna 200 weighing up to 15 kg. The mounting assembly 100 may be connected at a position between 200 mm to 300 mm length of the antenna 200 measured from the bottom end cap 200*b* of the antenna 200 having antenna length of 1000 mm. However, the mounting assembly 100 provided in the present disclosure, is not limited to use with the antenna 200 as specifically described herein.

Figure 2:
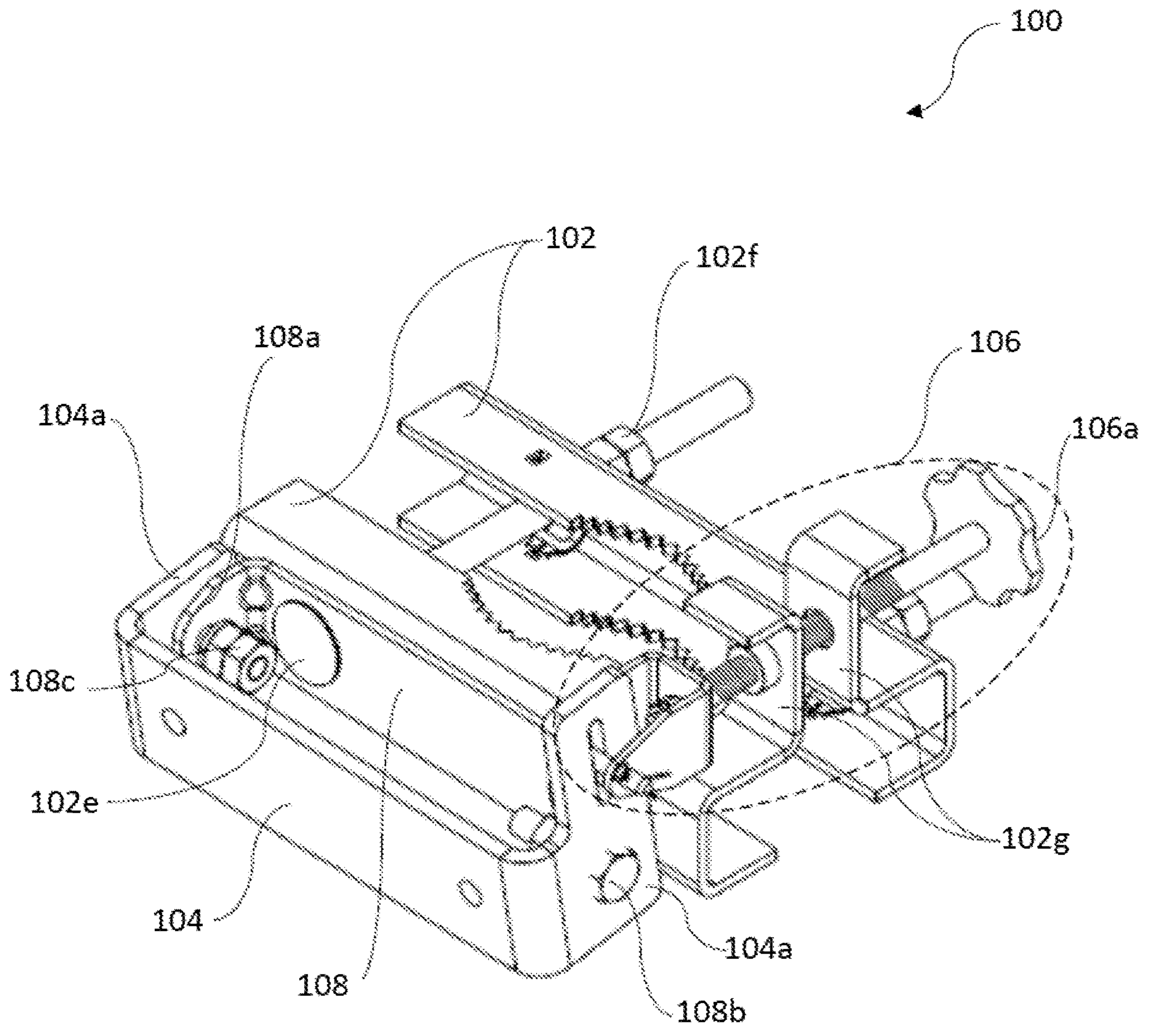
FIG. 2 is a perspective view of a mounting assembly for mounting the base station antenna to the support structure, in accordance with an embodiment of the present disclosure.
Figure 3:
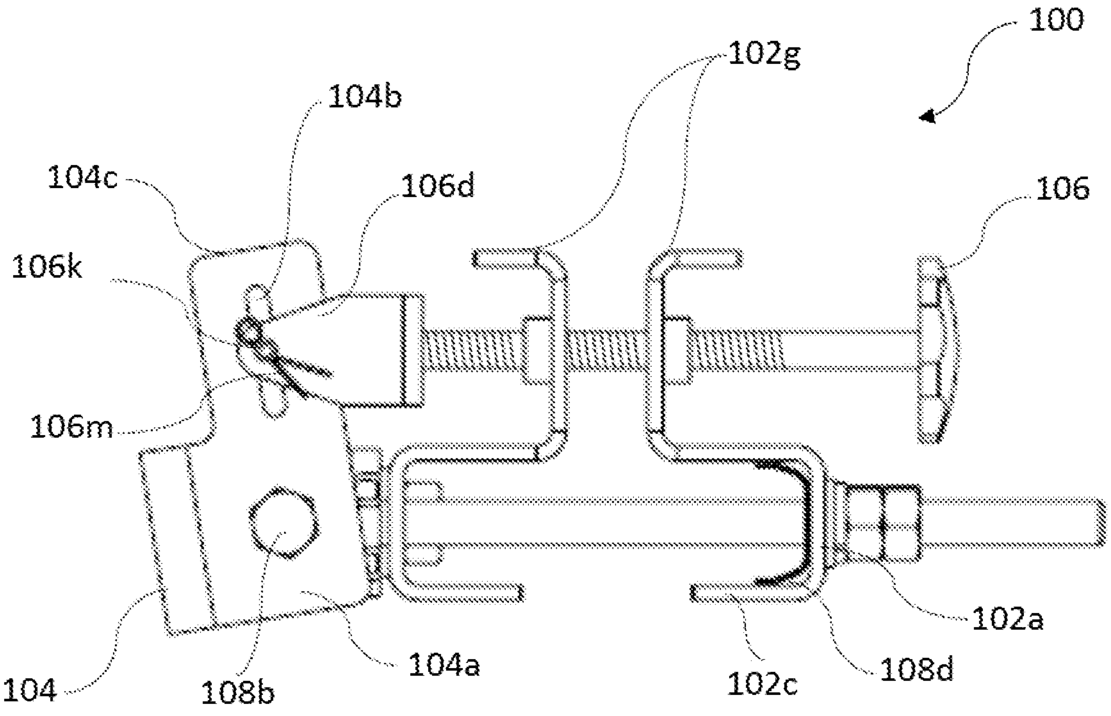
FIG. 3 is a side view of the mounting assembly of FIG. 2, in accordance with an embodiment of the present disclosure.

Referring to FIGS. 1-3, the mounting assembly 100 comprises a pair of clamp brackets 102, a mounting bracket 104 and a lead screw sub-assembly 106. The pair of clamp brackets 102 is configured to be connected to the support structure 300. The mounting bracket 104 is configured to be connected to the antenna 200 at the pre-determined position of the antenna 200. The lead screw sub-assembly 106 is configured to facilitate a tilt angle adjustment to the antenna 200 when required.

Figure 4:
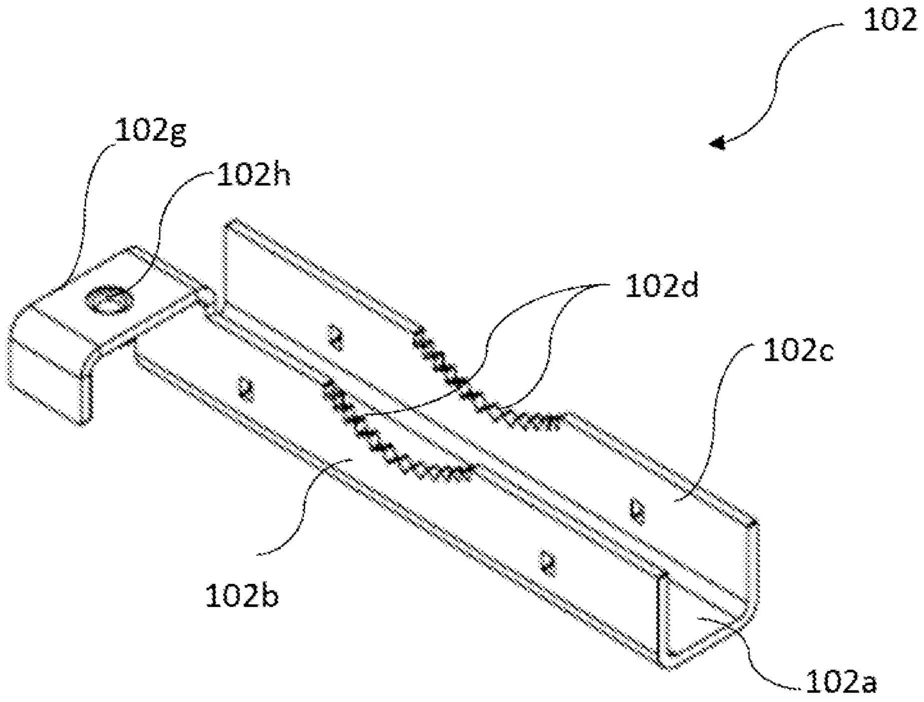
FIG. 4 is perspective view of a clamp bracket of the mounting assembly of FIG. 2, in accordance with an embodiment of the present disclosure.
Figure 5:
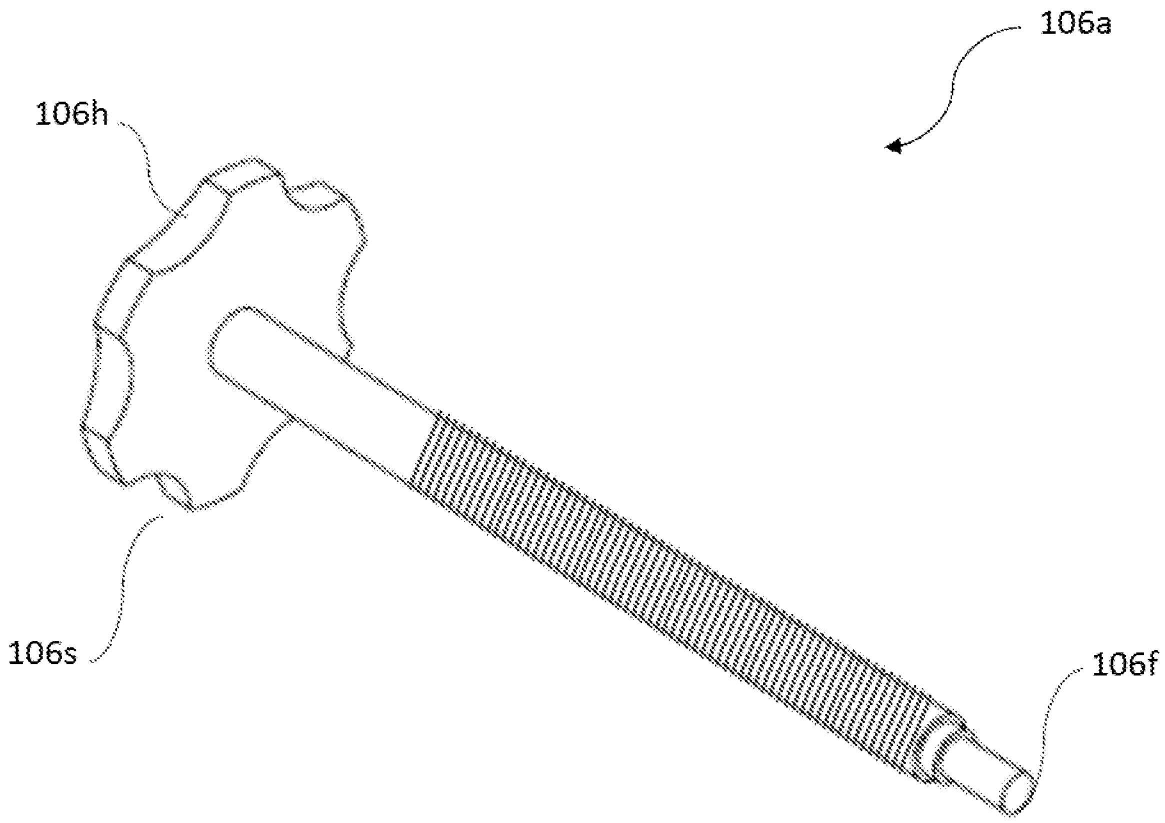
FIG. 5 is a perspective view of a lead screw of the mounting assembly of FIG. 2, in accordance with an embodiment of the present disclosure.
Figure 6:
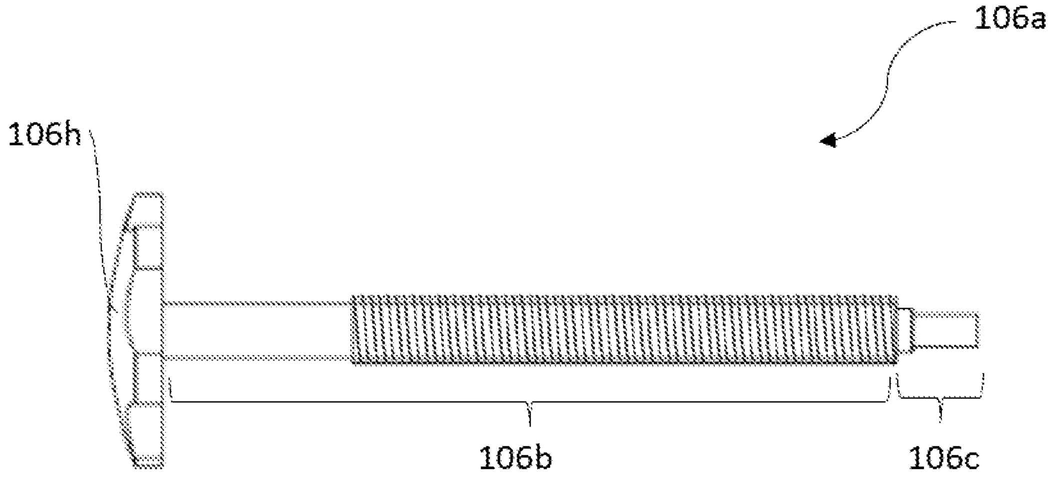
FIG. 6 is a side view of the lead screw of FIG. 5, in accordance with an embodiment of the present disclosure.

Referring to FIGS. 3 and 4, each of the clamp bracket of the pair of clamp brackets 102 comprise a first plate 102*a* and two side plates 102*b* and 102*c* extending perpendicularly from opposite edges of the first plate 102*a*, as shown in FIG. 4, such that a cross-section of the clamp bracket, as seen in a side view, forms a C-shaped profile. Each clamp bracket 102 includes a plurality of serrations 102*d* formed at a centre portion of each of the side plates 102*b* and 102*c*. The plurality of serrations 102*d* are configured to provide grip to the pair of clamp brackets 102 for mounting the clamp brackets on the support structure 300. As shown in FIG. 4, the plurality of serrations 102*d* formed on a curved portion of the side plates 102*b*, 102*c* in order to provide firm grip to the clamp brackets 102, while mounting to the cylindrical shaped support structure 300. The side plates 102*b*, 102*c* may have different shaped profiles depending upon an outer profile of the support structure 300, for instance—if the support structure has a polygonal shaped cross-section, then the side plates of the clamp brackets are formed with polygonal shaped portions at the centre of the side plates. The first plate 102*a* of each of the clamp brackets 102 is provided with a plurality of holes to receive long bolts 102*e* to connect clamp brackets 102 with the support structure 300. Each of the long bolts 102*e* is locked by a corresponding nut 102*f* to secure the clamp brackets 102 with the support structure 300. Although the exemplary configuration of the mounting assembly, as disclosed and shown in the present disclosure, describes long bolts and nuts for mounting the clamp brackets on the support structure, any other suitable fastening means may also be utilized to mount the clamp brackets 102 on the support structure 300.

Referring to FIG. 4, one of the side plates 102*b*, 102*c* of at least one of the clamp bracket 102 is provided with a first flange 102*g*. The first flange 102*g* extends from at least one of the side plates 102*b*, 102*c* of at least one of the clamp bracket 102. In the exemplary embodiment shown in FIG. 4, the first flange 102*g* extends from the side plate 102*b* of the clamp bracket 102. The first flange 102*g* may also be provided on both the side plates 102*b*, 102*c* of the at least one clamp bracket 102. Although the exemplary configuration of the mounting assembly, as disclosed and shown in the present disclosure, describes the first flange 102*g* is defined having a L-shaped structure to provide strength to the first flange 102*g*, any other suitable structure of the first flange 102*g* may be utilized which provides sufficient strength to the lead screw sub-assembly 106. In an embodiment, the first flange 102*g* may be integrally formed with the clamp bracket 102. In alternate embodiments, the first flange 102*g* may be externally attached to the clamp bracket 102 by permanent fixing means, for example—welding, soldering etc.

In an embodiment of the present disclosure, the first flange 102*g* is provided on both clamp brackets 102 of the mounting assembly 100 to provide sufficient strength and provisions for mounting the lead screw sub-assembly 106 to the pair of clamp brackets 102. The first flange 102*g* provided on the pair of clamp brackets 102 is defined with a threaded hole 102*h* formed on a vertical plate of the first flange 102*g*.

Referring again to FIG. 2 and FIG. 3, the mounting assembly 100 comprises an intermediate member 108 configured to be connected to a first clamp bracket of the pair of clamp brackets 102 arranged proximal to the mounting bracket 104. The intermediate member 108 is connected to the first clamp bracket by means of the long bolts 102*e* adapted to pass through the intermediate member 108 and each of the pair of clamp brackets 102. The intermediate member 108 may be integrally formed with the first clamp bracket of the pair of clamp brackets 102. Although the exemplary configuration of the mounting assembly 100, as disclosed and shown in the present disclosure, describes the intermediate member 108 defined as a U-shaped clamp, any other suitable structure may be utilized of the intermediate member 108 to pivotably connect the intermediate member 108 with the mounting bracket 104. The intermediate member 108 comprises a third pair of flanges 108*a* formed at opposite ends thereof. The intermediate member 108 is coupled to the mounting bracket 104 for supporting the mounting bracket 104 and also to facilitate the pivotal movement to the mounting bracket 104, during adjustment in tilt angle of the antenna 200. The intermediate member 108 is defined with provisions to pivotably couple the mounting bracket 104 by fasteners 108*b* and locking nuts 108*c*. The locking nuts 108*c* are configured to secure the mounting bracket 104 to the intermediate member 108 when the tilt angle adjustment of the antenna 200 is not required. The intermediate member 108 may be formed with a rib-like structure 108*d* at bending portion of the third pair of flanges 108*a* to enhance strength of the intermediate member 108.

The mounting bracket 104 comprises a second pair of flanges 104*a* formed at opposite ends of the mounting bracket 104. Each flange of the third pair of flanges 108*a* is connected with a corresponding flange of the second pair of flanges 104*a* for coupling the intermediate member 108 with the mounting bracket 104 by the fasteners 108*b* and locking nuts 108*c*. The third pair of flanges 108*a* is pivotably coupled with the second pair of flanges 104*a*, such that the second pair of flanges 104*a* is configured to pivot around the fasteners 108*b*. According to an embodiment of the present disclosure, the mounting bracket 104 comprises an elongated slot 104*b* defined in a side wall 104*c* of the mounting bracket 104. The side wall 104*c* of the mounting bracket 104 is defined inclusive of one of the flange of second pair of flanges 104*a*. The elongated slot 104*b* is positioned on the side wall 104*c* of the mounting bracket 104 such that that the elongated slot is eccentric to a mounting axis of the fasteners 108*b*.

Referring to FIGS. 2-6, the lead screw sub-assembly 106 comprises a lead screw 106*a* engaged with at least one clamp of the pair of clamp brackets 102 and an adjustment bracket 106*d* coupled at a first end 106*f* of the lead screw 106*a* and configured to allow a pivotal movement of the mounting bracket 104 with respect to the pair of clamp brackets 102. The first end 106*f* of the lead screw 106*a* is defined as an end proximal to the mounting bracket 104. The lead screw 106*a* is rotatable within the at least one clamp bracket 102 for adjusting a tilt angle of the antenna 200. The lead screw 106*a* comprises a second end 106*s* opposite to the first end 106*f* of the lead screw 106*a*. The second end 106*s* of the lead screw 106*a* comprises a head 106*h* of the lead screw 106*a*. The head 106*h* is provided to facilitate grip to hold and rotate the lead screw 106*a* during adjusting the tilt angle of the antenna 200. Alternatively, the rotation of the lead screw 106*a* may be governed by using an actuator coupled to the head 106*h* of the lead screw. The actuator may either be controlled remotely by an operator or by a switch mounted to the support structure 300.

The lead screw 106*a* further comprises a first portion 106*b* adapted to rotate within the at least one clamp bracket 102 and a second portion 106*c* adapted to receive a locking nut (not shown in the figures) for coupling the adjustment bracket 106*d* with the lead screw 106*a* at the first end 106*f* of the lead screw 106*a*. A diameter of the second portion 106*c* of the lead screw 106*a* is less than a diameter of the first portion 106*b* of the lead screw 106*a*. The variation in diameter of the first portion and second portion of the lead screw 106*a* provides a step profile structure to the lead screw 106*a* at the first end 106*f*. The step-profile of the lead screw 106*a* limits the movement of the adjustment bracket 106*d* towards the second end 106*s* of the lead screw by abutting the adjustment bracket 106*d* against the second portion 106*c* of the lead screw 106*a*.

Once again referring to FIGS. 2-4, the lead screw 106*a* is configured to engage with the threaded holes 102*h* provided on each of the first flange 102*g* of the pair of clamp brackets 102. The first portion 106*b* of the lead screw 106*a* is defined with a plurality of external threads adapted to rotatably engage with threads formed on holes 102*h* of each of the first flange 102*g*. The threaded engagement of the lead screw 106*a* with each flange 102*g* of the pair of clamp brackets 102 facilitates the transformation of rotational movement of the lead screw 106*a* to a linear movement of the lead screw 106*a*. The linear movement of the lead screw 106*a* exerts a push/pull force onto the mounting bracket 104, during the tilt angle adjustment of the antenna 200.

Figure 7:
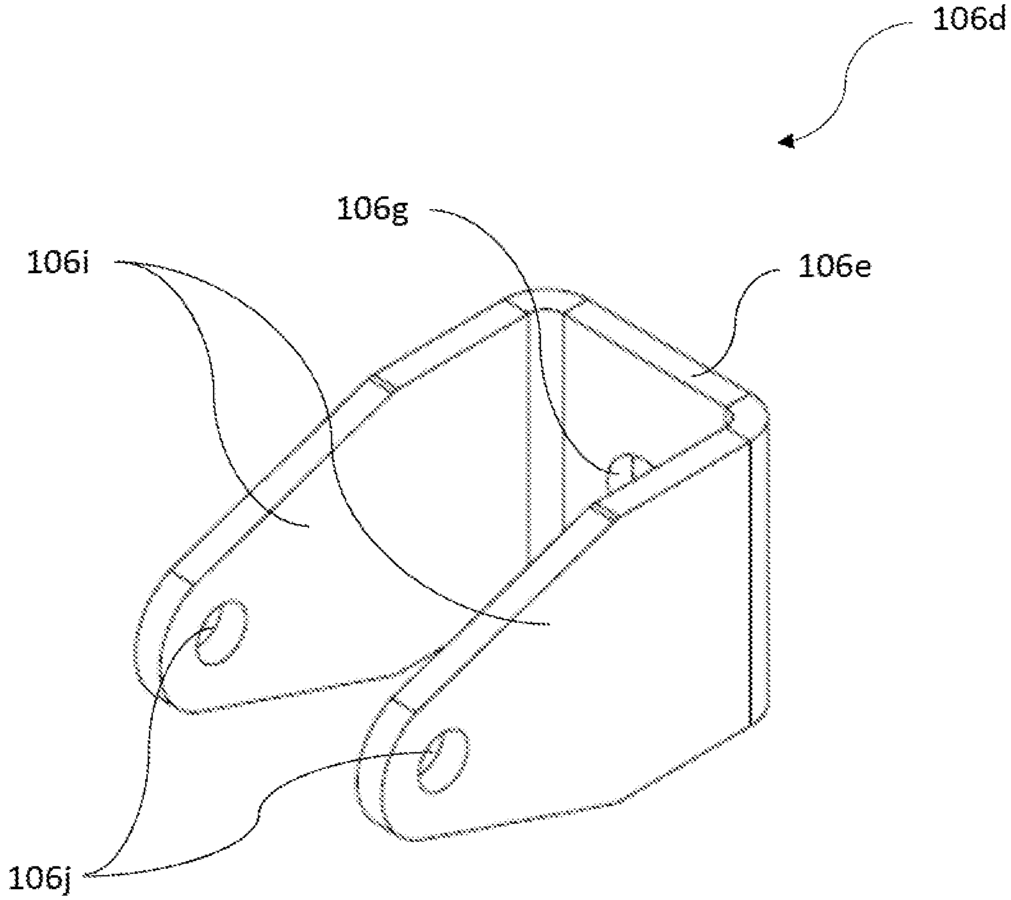
FIG. 7 is a perspective view of an adjustment bracket, excluding a connecting pin thereof, attachable to the lead screw of FIG. 5, in accordance with an embodiment of the present disclosure.

Referring to FIG. 7, the adjustment bracket 106*d* comprises a base plate 106*e* and a pair of arms 106*i* extending perpendicularly from the opposite edges of the base plate 106*e*. The base plate 106*e* is defined with a first aperture 106*g* adapted to receive the second portion 106*c* of the lead screw 106*a*. The adjustment bracket 106*d* is provided with a second aperture 106*j* formed on each of the pair of arms 106*i* to receive the connecting pin 106*k*. Once the adjustment bracket 106*d* is secured at the first end 106*f* of the lead screw 106*a*, one of the second pair of flanges 104*a* having the elongated slot 104*b* is positioned between the pair of arms 106*i* of the adjustment bracket 106*d*. As shown in FIG. 3, the connecting pin 106*k* is allowed to pass through the second apertures 106*j* and the elongated slot 104*b* to movably connect the adjustment bracket 106*d* with the mounting bracket 104. The connecting pin 106*k* is locked into a fixed position by inserting a cross-wire or cotter pin 106*m* into a hole provided in the connecting pin 106*k*. to the mounting bracket. The elongated slot 104*b* on the mounting bracket 104 is configured to receive and guide the connecting pin 106*k* of the adjustment bracket 106*d*. The clockwise rotation of the lead screw 106*a* initiates a linear movement of the lead screw 106*a* towards the mounting bracket 104 exerting a push force on the mounting bracket 104 by the connecting pin 106*k*. The counter-clockwise rotation of the lead screw 106*a* initiates linear movement of the lead screw 106*a* away from the mounting bracket 104 exerting a pull force on the mounting bracket 104 by the connecting pin 106*k*. The rotation of the lead screw 106*a* moves the connecting pin 106*k* within the elongated slot 104*d* of the mounting bracket 104 for adjusting the tilt angle of the antenna 200.

In another embodiment of the present disclosure a method for adjusting a tilt angle of an antenna 200 is disclosed. The antenna 200 is connected to a mounting bracket 104 of a mounting assembly 100. The method comprises the step of: loosening of fasteners 108*b* adapted to connect the mounting bracket 104 with an intermediate member 108. The method further comprises the step of: applying rotational movement to a lead screw 106*a* connecting the mounting bracket 104 with one of a pair of clamp brackets 102, such that an adjustment bracket 106*d* secured to the lead screw 106*a* exerts a push force or pull force onto the mounting bracket 104 to facilitate pivotal movement of the mounting bracket 104 around the fasteners 108*b* for adjusting a tilt angle of the antenna 200 with respect to the pair of clamp brackets 102. The method further comprises: tightening the fasteners 108*b* connecting the mounting bracket 104 with the intermediate member 108 to secure the antenna 200 at a particular orientation.

The clockwise rotation of the lead screw 106*a* facilitates pivotal movement of the antenna 200 in a down-tilt direction. The down-tilt direction is defined as a direction of movement of the antenna 200 when the bottom end cap portion of the antenna 200*b* moves towards the support structure 300. The mounting assembly 100 provides at least 0-15° down tilt movement of the antenna 200, but is not limited to the same. The counter clockwise rotation of the lead screw 106*a* facilitates pivotal movement of the antenna 200 in an up-tilt direction. The up-tilt direction is defined as a direction of movement of the antenna 200 when the bottom end cap portion of the antenna 200*b* moves away from the support structure 300. The mounting assembly 100 provides at least 0-5° up-tilt movement of the antenna 200, but not limited to the same.

The antenna 200 may comprise a bumper element fixed at the bottom end cap 200*b* of the antenna 200 to prevent damage caused to the antenna 200 during excess angular movement of antenna 200. The bumper element may be formed from an elastic material which intends to absorb shock on the antenna 200 during performing the tilt angle adjustment of the antenna 200.

The various embodiments of the present disclosure have been described above with reference to the accompanying drawings. The present disclosure is not limited to the illustrated embodiments; rather, these embodiments are intended to fully and completely disclose the subject matter of the disclosure to those skilled in this art. In the drawings, like numbers refer to like elements throughout. Thicknesses and dimensions of some components may be exaggerated for clarity.

Spatially relative terms, such as "under", "below", "lower", "over", "upper", "top", "bottom" and the like, may be used herein for ease of description to describe one element or feature's relationship to another element(s) or feature(s) as illustrated in the FIGS. It will be understood that the spatially relative terms are intended to encompass different orientations of the device in use or operation in addition to the orientation depicted in the FIGS. For example, if the device in the figures is turned over, elements described as "under" or "beneath" other elements or features would then be oriented "over" the other elements or features. Thus, the exemplary term "under" can encompass both an orientation of over and wider. The device may be otherwise oriented (rotated 90 degrees or at other orientations) and the spatially relative descriptors used herein interpreted accordingly.

Herein, the terms "attached", "connected", "interconnected", "contacting", "mounted", "coupled" and the like can mean either direct or indirect attachment or contact between elements, unless stated otherwise.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises", "comprising", "includes" and/or "including" when used in this specification, specify the presence of stated features, operations, elements, and/or components, but do not preclude the presence or addition of one or more other features, operations, elements, components, and/or groups thereof.

While considerable emphasis has been placed herein on the particular features of this disclosure, it will be appreciated that various modifications can be made, and that many changes can be made in the preferred embodiments without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

REFERRAL NUMERALS

| PARTICULARS | REFERRAL NUMERAL |
|---|---|
| Mounting assembly | 100 |
| Pair of clamp brackets | 102 |
| First plate of clamp brackets | 102a |
| Side plates of clamp brackets | 102b, 102c |
| Serrations | 102d |
| Long bolts | 102e |
| Nuts | 102f |
| First Flange | 102g |
| Threaded hole | 102h |
| Mounting bracket | 104 |
| Second pair of flanges | 104a |
| Elongated slot | 104b |
| Side wall | 104c |
| Lead screw sub-assembly | 106 |
| Lead screw | 106a |
| First portion of lead screw | 106b |
| Second portion of lead screw | 106c |
| Adjustment bracket | 106d |
| Base plate of adjustment bracket | 106e |
| First end of lead screw | 106f |
| First aperture on base plate | 106g |
| Head of lead screw | 106h |
| Pair of arms | 106i |
| Second aperture on the pair of arms | 106j |
| Connecting pin | 106k |
| Cross-wire | 106m |
| Second end of lead screw | 106s |
| Intermediate member | 108 |
| Third pair of flanges | 108a |
| Fasteners | 108b |
| Locking nuts | 108c |
| Ribs | 108d |
| Base station antenna | 200 |
| Bottom end cap of antenna | 200b |
| Support structure | 300 |

EQUIVALENTS

The embodiments herein and the various features and advantageous details thereof are explained with reference to the non-limiting embodiments in the description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles and the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

We claim:

1. A mounting assembly for a base station antenna, the mounting assembly comprising:
- a pair of clamp brackets;
- a mounting bracket configured to be connected to the base station antenna; and
- a lead screw sub-assembly adapted to pivotably couple the mounting bracket to the pair of clamp brackets, the lead screw sub-assembly comprising:
  - a lead screw engaged with at least one clamp bracket of the pair of clamp brackets; and
  - an adjustment bracket coupled at a first end of the lead screw and configured to allow a pivotal movement of the mounting bracket with respect to the pair of clamp brackets,
- wherein the lead screw is rotatable within the at least one clamp bracket for adjusting a tilt angle of the base station antenna,
- wherein the mounting bracket comprises an elongated slot defined in a side wall of the mounting bracket, and
- wherein the elongated slot is configured to receive and guide a connecting pin of the adjustment bracket.

2. The mounting assembly as claimed in claim 1, wherein the mounting assembly comprises an intermediate member connected to a first clamp bracket of the pair of clamp brackets arranged proximal to the mounting bracket,
- wherein the intermediate member is configured to couple with the mounting bracket for supporting the mounting bracket.

3. The mounting assembly as claimed in claim 2, wherein the intermediate member comprises a third pair of flanges formed at opposite ends thereof; the mounting bracket comprises a second pair of flanges formed at opposite ends thereof; wherein each flange of the third pair of flanges is connected with a corresponding flange of the second pair of flanges for coupling the intermediate member with the mounting bracket.

4. The mounting assembly as claimed in claim 3, wherein each flange of the third pair of flanges is coupled with the corresponding flange of the second pair of flanges by fasteners.

5. The mounting assembly as claimed in claim 3, wherein the third pair of flanges is pivotably coupled with the second pair of flanges, the second pair of flanges being configured to pivot around the fasteners.

6. The mounting assembly as claimed in claim 1, wherein the lead screw comprises
- a first portion adapted to rotate within the at least one clamp bracket; and
- a second portion adapted to receive a locking nut for coupling the adjustment bracket with the lead screw at the first end of the lead screw.

7. The mounting assembly as claimed in claim 6, wherein a diameter of the second portion of the lead screw is less than a diameter of the first portion of the lead screw.

8. The mounting assembly as claimed in claim 1, wherein rotation of the lead screw moves the connecting pin within the elongated slot of the mounting bracket for adjusting the tilt angle of the base station antenna.

9. The mounting assembly as claimed in claim 1, wherein the tilt angle of the base station antenna lies within a range of 0-15° in a down-tilt direction.

10. The mounting assembly as claimed in claim 1, wherein the tilt angle of the base station antenna lies within a range of 0-5° in an up-tilt direction.

11. The mounting assembly as claimed in claim 1, wherein a point of contact of the mounting bracket with the base station antenna is proximate a centre of gravity of the base station antenna.

12. The mounting assembly as claimed in claim 1, wherein the adjustment bracket comprises:
- a base plate defined with a first aperture adapted to receive the second portion of the lead screw, and
- a pair of arms extending perpendicularly from opposite ends of the base plate.

13. The mounting assembly as claimed in claim 12, wherein the adjustment bracket is provided with second apertures formed on each of the pair of arms to receive a connecting pin.

14. A method for adjusting a tilt angle of a base station antenna connected to a mounting bracket of a mounting assembly, comprising steps of:
- loosening of fasteners adapted to connect the mounting bracket with an intermediate member;
- applying rotational movement to a lead screw connecting the mounting bracket with one of a pair of clamp brackets, such that an adjustment bracket secured to the lead screw exerts a push force or pull force onto the mounting bracket via a connection pin of the adjustment bracket received and guided by an elongated slot in the mounting bracket to facilitate pivotal movement of the mounting bracket for adjusting a tilt angle of the base station antenna with respect to the pair of clamp brackets; and
- tightening the fasteners connecting the mounting bracket with the intermediate member to secure the base station antenna at a particular orientation.

* * * * *